Patented Sept. 5, 1944

2,357,573

UNITED STATES PATENT OFFICE 2,357,573

FILLING AND BINDING COMPOSITION

Ernest E. Beck, Chicago, Ill., assignor of one-half to August W. Baumgart, Chicago, Ill.

No Drawing. Application March 15, 1941, Serial No. 383,559

2 Claims. (Cl. 106—193)

This invention relates to improvements in filling and binding compositions.

Repair work on automobile and other motor vehicle fenders and sheet metal portions of bodies of such vehicles in the way of removing various deflections, wrinkles and depressions is a slow laborious operation performed generally by highly skilled metal workers. Particularly, is this true in the application of the finishing touches to a disfigured part. In many cases it is expedient to grind off slight protuberances in order to get a substantially smooth surface. Aside from the labor involved, the removal of metal by grinding is highly undesirable, since it results in a weakened structure.

According to the present invention a suitable composition is provided for filling in depressions on the surface of a part after the same has been brought by mechanical means practically to its original form. A great deal of time and effort required for reforming a damaged or disfigured part is thus saved. Additionally, by this means, a lesser degree of skill is required for effecting a straightening and smoothing of the part.

In accordance with the foregoing, it is therefore an object of this invention to provide a composition for filling depressions, recesses and the like, whereby disfigured surfaces may with a minimum of effort be smoothed and made ready for the application of paint or lacquer.

Another object of this invention is the provision of a filling composition which when set will be elastic and strongly adhesive to the materials, whether fibrous or metallic, on which it is applied.

A further object of this invention is the provision of a filling composition which may be very easily applied to a surface, either by spraying or brushing, and which may be surfaced, as by sanding, and polished in the usual manner. These and other objects of the invention are attained by providing a homogenous mixture of finely ground calcined gypsum and lacquer in the proper proportions to produce the desired result.

While any suitable commercial lacquer or combinations of lacquers may be used in preparing my composition, I find it preferable, because of the high pyroxylin content, to use the lacquer product described in re-issue Patent No. 16,803.

According to the present invention, I mix the following ingredients in the proportions stated:

48 parts of the above described lacquer with 48 parts of pure calcined gypsum, of a fineness to pass through a screen of 100 mesh per square inch, the formula being $CaSO_4 \cdot \frac{1}{2}H_2O$. The resultant mixture is highly viscous and to make it workable a thinning solution of any well known solvents is added. The amount of thinning solution may be from about 2% to 10% of the weight of the gypsum-lacquer mixture and, as an example, may be comprised of 50% acetone, 30% amylacetate and 20% toluene. It will be understood that the quantity of thinning solution may be varied accordingly as the composition is to be used. If the composition is to be sprayed, a composition of low viscosity is desirable and in that case a greater quantity of thinning solution would be required than if the composition were applied by other means.

I have found that the composition embodying the invention will adhere tenaciously practically to any kind of surface, whether metal, wood, glass, wax, cloth or rubber and its tenacious character is not affected by rust, grease, dirt or gum which may be present on the surface before the composition is applied thereto. The composition dries very rapidly and is in condition for sanding from one to thirty minutes after application, depending upon the thickness of the coating applied. When dry, the composition forms a tough elastic surface upon which paint or lacquer may be applied without further processing.

It is to be understood that I do not desire to be limited to exact details of composition and manufacture described, as obvious modifications will present themselves to persons skilled in the art.

I claim:

1. A filling and binding composition comprising substantially 48 parts by weight of a pyroxylin containing lacquer, 48 parts by weight of calcined gypsum and 2–10 parts by weight of a lacquer solvent, the said lacquer having a viscosity below 25,000 centipoises.

2. An article coated with a tough substantially strongly tenacious film formed from a composition comprising substantially 48 parts by weight of a pyroxylin containing lacquer, 48 parts by weight of calcined gypsum and 2–10 parts by weight of a lacquer solvent, the said lacquer having a viscosity below 25,000 centipoises.

ERNEST E. BECK.